United States Patent

[11] 3,612,225

| [72] | Inventor | Anthony C. Evans<br>Westland, Mich. |
|---|---|---|
| [21] | Appl. No. | 864,598 |
| [22] | Filed | Oct. 8, 1969 |
| [45] | Patented | Oct. 12, 1971 |
| [73] | Assignee | Kelsey-Hayes Company |

[54] SELF-ADJUSTING DISK PARKING BRAKE
9 Claims, 4 Drawing Figs.

[52] U.S. Cl. .................................................. 188/72.6,
188/71.8, 188/106 F, 188/196 BA
[51] Int. Cl. ...................................................... F16d 55/16,
F16d 65/56
[50] Field of Search ........................................... 188/71.7–
71.9, 72.6, 106 F, 196 RR

[56] References Cited
UNITED STATES PATENTS

| 3,342,291 | 9/1967 | Warwick et al............ | 188/106 F |
| 3,456,765 | 7/1969 | Meier......................... | 188/106 F |

Primary Examiner—Duane A. Reger
Attorney—Harness, Dickey & Pierce

ABSTRACT: A disk brake assembly embodying a separate mechanical actuator for the primary brake pad. This mechanical actuator embodies a releasable screw-and-nut mechanism that is effective to accomplish an automatic adjustment of the at rest position of the brake pad.

INVENTOR.
Anthony C. Evans
BY
Harness, Dickey & Pierce
ATTORNEYS

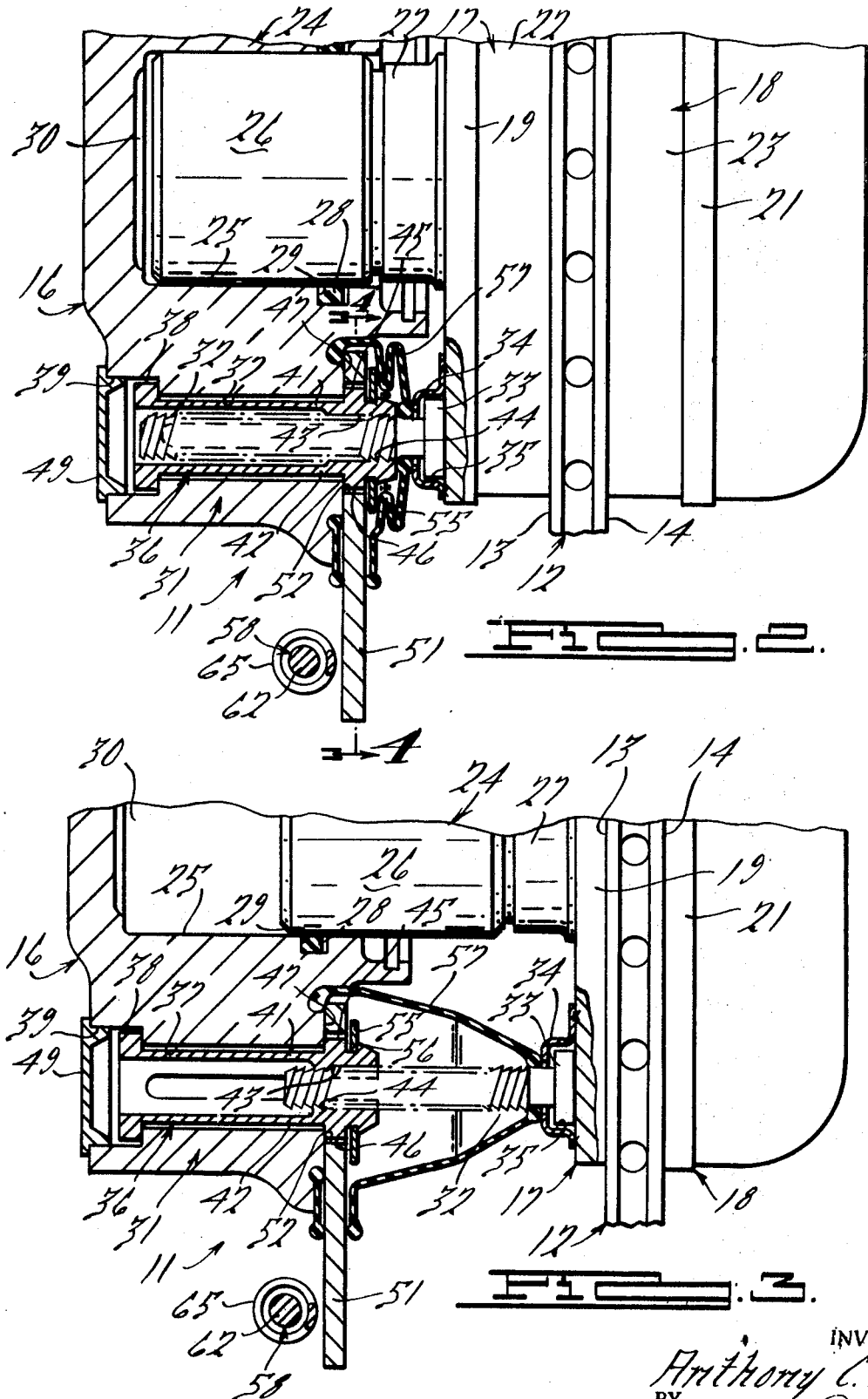

3,612,225

SELF-ADJUSTING DISK PARKING BRAKE

BACKGROUND OF THE INVENTION

This invention relates to an improved disk brake assembly and more particularly to an improved automatic adjuster and mechanically operated actuating mechanism for a disk brake.

Disk brakes are currently enjoying a wide degree of acceptance due to their several inherent advantages over drum-type brakes. For the most part, the application of the disk type brake to motor vehicles has been limited to the front wheels. One reason for this is the difficulty in providing a satisfactory mechanical actuator to serve as a parking brake when disk-type brakes are used on the rear vehicle wheels. It has been proposed to use an entirely separate braking mechanism that operated on the disk of the service brakes as a parking brake mechanism. Obviously, such an arrangement adds considerable cost to the overall assembly and the use of the additional braking mechanism presents space problems. As an alternative, it has been proposed to employ a mechanical actuator that acts through the actuating piston of the primary brake system for a parking brake. Such an arrangement complicates the problems of effectively sealing the hydraulic motor of the brake.

It is, therefore, a principal object of this invention to provide an improved and simplified disk brake mechanism embodying a mechanically actuated disk brake.

Although most hydraulically operated disk-type brakes are inherently self-adjusting, at times it is desirable to prevent a more positive adjustment for lining wear. In addition, if a mechanical actuator is used, some form of adjustment must be provided to compensate for the wear of the frictional lining. It is, of course, most desirable if this adjustment is accomplished automatically.

It is, therefore, a still further object of this invention to provide an improved automatic adjuster for a disk-type parking brake.

It is another object of the invention to provide an automatic lining wear adjuster for a disk-type brake that is embodied in the mechanical actuating system.

SUMMARY OF THE INVENTION

A disk brake assembly embodying this invention is adapted to be both hydraulically and mechanically actuated. The brake includes a brake pad and fluid motor means associated with the brake pad for urging the brake system into engagement with an associated disk. Stop means are associated with the brake system independently of the fluid motor means for determining the at rest position of the brake pad. Means are provided for actuating the stop means and the brake pad for bringing the brake pad into engagement with the associated disk independently of the fluid motor means. Means are additionally provided for automatically adjusting the position of the stop means and the at rest position of the brake pad to compensate for wear of the brake pad.

A further feature of the invention is adapted to be embodied in a combined actuator and automatic wear adjuster for a disk brake assembly that includes a frictional pad assembly movable relative to a support into braking engagement with an associated brake disk. The combined actuator and adjuster comprises a male threaded member and a female threaded member engage with the male threaded member. The members are movable relative to each other in an axial direction upon relative rotation thereof. One of the members is fixed axially relative to the friction pad assembly and the other of the members is fixed axially relative to the support. Means are provided for rotating one of the members relative to the other member for axially moving the friction pad assembly into braking engagement with the brake disk. Means are additionally provided for disengaging the members from each other for axial movement of the member axially fixed relative to the friction pad assembly and for axial movement of the friction pad assembly without relative rotation of the members.

BRIEF DESCRIPTION OF THE DRAWINGS

FIG. 2 is an enlarged cross-sectional view taken along the line 2—2 of FIG. 1 and shows the assembly before the frictional linings of the brake pads have undergone any significant wear.

FIG. 3 is a cross-sectional view, in part similar to FIG. 2, and shows the assembly after the frictional lining is completely worn.

DETAILED DESCRIPTION OF THE PREFERRED EMBODIMENT

Figure 1:
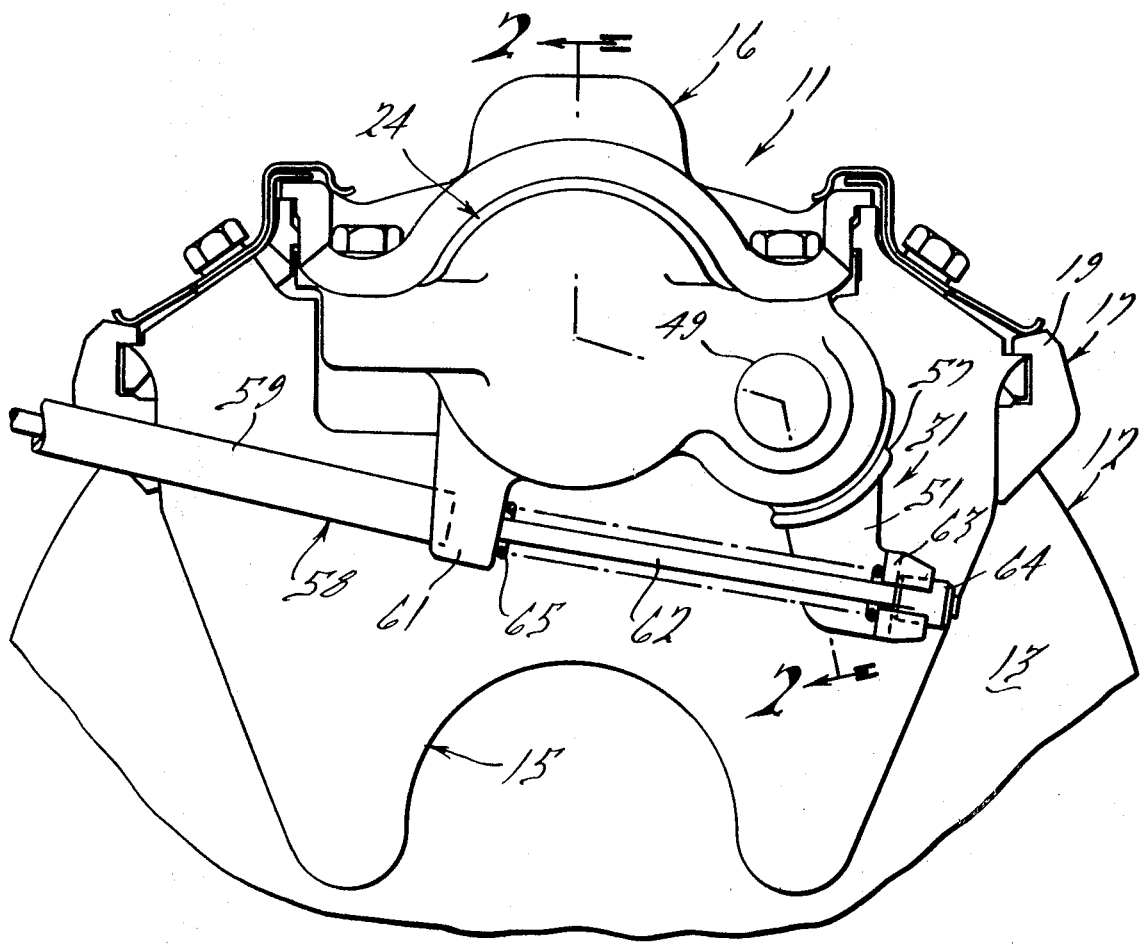
FIG. 1 is a side elevational view of a portion of a disk brake assembly embodying this invention.

The reference numeral 11 indicates generally a disk brake assembly embodying this invention. The disk brake assembly 11 is particularly adapted for use on the rear wheels of a motor vehicle and embodies both a hydraulic and mechanical actuating system to function as the service and parking brakes, respectively. The brake assembly 11 is particularly adapted to cooperate with a rotor or disk 12 which may be of the ventilated type and that forms oppositely facing braking surfaces 13 and 14. The disk 12 is adapted to be affixed for rotation with the vehicular wheel in any known manner.

A stationary torque plate 15 is affixed against rotation with respect to the vehicle adjacent one side of the disk 12. A caliper assembly, indicated generally by the reference numeral 16, is associated with the torque plate 15 and is supported adjacent the outer periphery of the disk 12. The caliper 16 has oppositely disposed legs that are juxtaposed to the disk braking surfaces 13 and 14.

Brake pad assemblies 17 and 18 are associated with each of the legs of the caliper assembly 16. Each of the brake pad assemblies 17 and 18 includes a respective backing plate 19 and 21 and a frictional lining 22 and 23. The frictional linings 22 and 23 are adapted to frictionally engage the disk braking surfaces 13 and 14 for braking the rotation of the disk 12. In order to accomplish this braking operation, separate fluid motors may be associated with each of the brake pads 17 and 18. Alternatively, the brake assembly 11 may be of the sliding caliper type whereby one fluid motor assembly is employed for actuating both of the brake pad assemblies 17 and 18. Although this latter type of embodiment is depicted, it is to be understood that certain features of the invention may be employed in connection with other types of brake assemblies; for example those in which separate fluid motors are employed for actuating each of the brake pad assemblies.

A fluid motor, indicated generally by the reference numeral 24, is provided for actuating the brake pad assembly 17 and for generating a reactive force upon the caliper assembly 16, which reactive force is employed for actuating the brake pad assembly 18 in any known manner common with the sliding caliper-type brake. The fluid motor 24 is comprised of a cylinder bore 25 that is formed in the caliper assembly 16 and which slidably supports a piston 26. The piston 26 has an extension 27 that is abuttingly engaged with the brake pad assembly backing plate 19 for actuating the brake pad assembly 17 into frictional engagement with the disk braking surface 13. The chamber 30 formed at the base of the cylinder bore 25 on one side of the piston 26 is adapted to be supplied selectively with fluid under pressure in any known manner. A generally rectangular cross-sectional-shaped seal 28 is received in a groove 29 formed adjacent the outer side of the cylinder bore 25 for sealing the fluid motor 24 and for exerting some restoring force upon the piston 26 in a known manner.

A combined mechanically actuated parking brake and automatic adjuster, indicated generally by the reference numeral 31, is additionally provided for operating the brake pads 17 and 18. This assembly includes a male threaded member 32, the threads of which are of the buttress type. This member has an enlarged headed portion 33 that is juxtaposed to the backing plate 19 of the pad assembly 17. A sheet metal cage 34 is affixed, as by welding, to the backing plate 19 and forms a cavity 35 in which the headed portion 33 is captured so as to axially affix the male threaded member 32 relative to the brake pad assembly 17.

A sleevelike member 36 is supported in a cylindrical bore 37 formed in the caliper assembly 16 at one side of the cylindrical bore 25. The member 36 has an enlarged headed portion 38 that is received in a counterbore 39 formed at the outer end of the bore 37. At its opposite end, the member 36 is split to form two-facing resilient spring fingers 41 and 42 that extend on opposite sides of the male threaded member 32 and which are formed with complementary female threaded portions 43 and 44 that engage the buttress threads of the member 32. Enlarged projections 45 and 46 extend outwardly from the portions 41 and 42 and are abuttingly engaged with a shoulder 47 formed on the caliper assembly 16. Hence, the member 36 is axially fixed within the caliper assembly 16 but is free to rotate with respect to it. The resilience of the spring fingers 41 and 42 permits the member 36 to be inserted into the bore 37 through the counterbore 39. When the member 36 is in place, the counterbore 39 may be closed at its outer end by means of a closure plug 49 to preclude the entry of dirt into the parking brake mechanism 31.

An actuating lever 51 is provided that has a generally keyshaped opening 52 (FIG. 4) that is complementary to the enlarged portions 45 and 46 of the member 36. Clearances 53 and 54 are provided adjacent the outer extremities of the portions 45 and 46 for a reason which will become more apparent. The actuating lever 51 is held axially with respect to the member 36 by means of a snap ring 55 that is received in a groove 56 formed in the member 36 adjacent the portions 45 and 46 (FIGS. 2 and 3). A bootlike dust seal, indicated generally by the reference numeral 57, encircles the inner end of the member 36, a portion of the actuating lever 51 and the male threaded member 32 adjacent the cage 34 to provide an effective dust seal.

A Bowden wire actuator, indicated generally by the reference numeral 58, is provided for rotating the actuating lever 51. The actuator 58 includes a protective sheath 59 that is held at its lower end in an outstanding boss 61 formed on the caliper assembly 16 (FIG. 1). A wire actuator 62 of the Bowden wire 58 extends through the boss and is fixed relative to a tang 63 of the actuating lever 51 by means of a ferrule 64. A coil compression spring 65 encircles the exposed portion of the wire actuator 62 and engages the tang 63 and caliper projection 61 for exerting a counterclockwise bias on the actuating lever 51 as viewed in FIG. 1. The opposite end of the wire actuator 62 may be connected to any suitable actuating mechanism for operator control.

OPERATION

As has been previously noted, the brake pads 17 and 18 may be operated hydraulically by pressurizing the chamber 30. The piston 26 then moves to the right as shown in FIG. 2 and a reactive force is exerted upon the caliper 16 causing it to shift to the left. Thus, the brake pad assemblies 17 and 18 are brought into frictional engagement with the respective surfaces 13 and 14 of the disk 12. It should be appreciated that with this type of brake assembly the degree of movement of the brake pad assemblies is relatively small. During this movement and if no significant wear of the linings 22 and 23 has taken place, the brake pad 17 and specifically its backing plate 19 and the cage 34 will move relative to the headed portion 33 of the male threaded member 32. It should be noted from an inspection of FIGS. 2 and 3 that a slight clearance exists between the cavity 35 of the cage 34 and the headed portion 33. Thus, if there has been no significant lining wear, the mechanical actuator and automatic adjusting mechanism 31 will not be affected during hydraulic operation.

Figure 4:
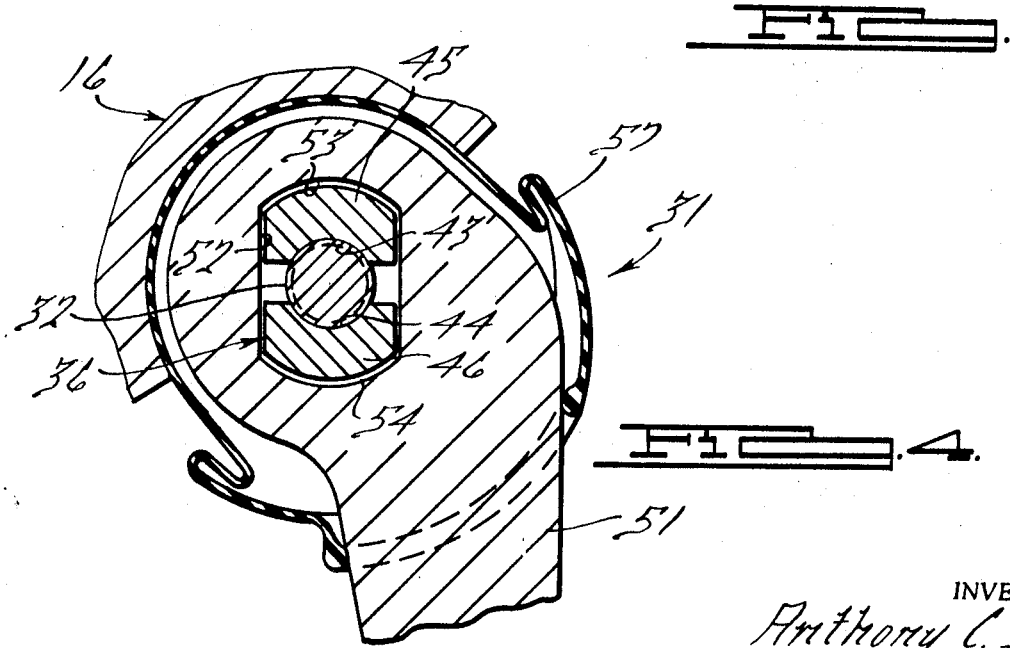
FIG. 4 is a still further enlarged cross-sectional view taken along the line 4—4 of FIG. 2.

If there has been some significant wear of the brake linings 22 and 23, the clearance in the cage 34 will be taken up and the cage 34 will engage the headed portion 33 and cause the male threaded member 32 to move along with the brake pad assembly 17. At the same time, the member 36 will be drawn to the left along with the brake pad assembly 18 due to its axial connection with the caliper assembly 16. Hence, the members 32 and 36 will move axially with respect to each other. When this occurs, the buttress threads will cam the spring fingers 41 and 42 outwardly, this movement being permitted by the previously noted clearances 53 and 54 between the spring finger portions 45 and 46 and the actuating lever 51 (FIG. 4). Upon release of the brake pads 17 and 18, the spring fingers 41 and 42 will engage new threads of the member 32 and cause the member 32 to be held in a new at rest position. FIG. 3 shows the position of the mechanism after the linings 22 and 23 have been fully worn. It should be noted that the mechanism 31 will not hold the brake pad assemblies 17 and 18 in tight engagement with the disk 12 when the hydraulic pressure is relieved due to the clearance that exists between the cage 34 and the male threaded members headed portion 33. Thus, when the seal 28 exerts its restoring force on the piston 26, there will be only light rubbing contact of the pad assemblies 17 and 18 with the disk 12.

When it is desired to mechanically actuate the brake assembly, the Bowden wire actuator 58 is operated to exert a pull on the wire actuator 62. The actuating lever 51 is then rotated in a clockwise direction as viewed in FIG. 1 and the member 36 will be rotated in a like direction. The threaded engagement with the member 32 is such that an axial extension of the members 32 and 36 will result. Hence, the member 32 acts on the brake pad assembly 17 to urge it into engagement with the braking surface 13 of the disk 12. At the same time, the member 36 will act on the caliper assembly 16 through the reactive force and actuate the brake pad assembly 18 into engagement with the disk braking surface 14. When the pull on the wire 62 is released, the coil spring 65 will return the actuating lever 51 to its at rest position and the brake pad assemblies 17 and 18 will be released.

What is claimed is:

1. In a disk brake assembly comprising a brake pad, fluid motor means associated with said brake pad for urging said brake pad into engagement with an associated brake disk, stop means associated with said brake pad independently of the fluid motor means for determining the at rest position of said brake pad, means for actuating said stop means and said brake pad for bringing said brake pad into engagement with the associated disk independently of said fluid motor means, and automatic adjusting means associated with said stop means for adjusting the at rest position of said brake pad to compensate for wear, said automatic adjusting means being effective to adjust the position of said stop means upon movement of the brake pad greater than a predetermined amount when said brake pad is actuated by said fluid motor means, said automatic adjusting means including a male threaded member, a female threaded member engaged with said male threaded member, said members being movable relative to each other in an axial direction upon relative rotation thereof, one of said members being fixed axially relative to the brake pad, the other of said members being fixed axially relative to a brake support, the means for actuating the stop means comprising means for rotating one of the members relative to the other member for axially moving said brake pad into braking engagement with the associated brake disk, and means for disengaging said members from each other for axial movement of the member axially fixed relative to the brake pad and for axial movement of the brake pad without relative rotation of the members upon actuation of the fluid motor means and if more than a predetermined degree of wear of the lining of the brake pad has taken place.

2. A disk brake assembly as set forth in claim 1 wherein the brake pad includes a backing plate, the fluid motor means being engaged with the backing plate in one area for urging the brake pad into its engagement with the associated brake disk, the stop means being in engagement with the backing plate at another area.

3. A combined actuator and automatic wear adjuster for a disk brake assembly including a frictional pad movable relative to a support into braking engagement with an associated brake disk, said combined actuator and adjuster comprising a male threaded member, a female threaded member engaged with said male threaded member, said members being movable relative to each other in an axial direction upon relative rotation thereof, one of said members being fixed axially relative to said friction pad assembly, the other of said members being fixed relative to said support, means for rotating one of said members relative to the other of said members for axially moving said friction pad into braking engagement with said brake disk, and means for disengaging said members from each other for axial movement of the member fixed axially relative to said friction pad and for axial movement of said friction pad without relative rotation of said members.

4. A combined actuator and automatic wear adjuster as set forth in claim 3 further including actuating means for moving the brake pad into engagement with the associated disk when the members are disengaged.

5. A combined actuator and automatic wear adjuster as set forth in claim 3 wherein the male threaded member is fixed axially relative to the friction pad and the female threaded member is fixed axially with respect to the support.

6. A combined actuator and automatic wear adjuster as set forth in claim 3 wherein the threads of the members are serrated, the female threaded member comprising a split nut yieldably biased into engagement with said male threaded member.

7. A combined actuator and automatic wear adjuster as set forth in claim 6 wherein the male threaded member is axially fixed relative to the friction pad and the female threaded member is axially fixed relative to the support, the means for rotating one of the members comprising a lever fixed to the female threaded member for rotating the female threaded member, and further including hydraulic motor means associated with the friction pad for moving said friction pad into engagement with the associated disk.

8. A combined actuator and automatic wear adjuster as set forth in claim 7 wherein the female threaded member has a first pair of surfaces engaged with the lever for rotating the female threaded member upon rotation of the lever and a second pair of surfaces spaced from the lever for movement of the split portions of said female threaded member relative to the lever for disengagement from the male threaded member.

9. In a disk brake assembly comprising a brake pad, fluid motor means associated with said brake pad for urging said brake pad into engagement with an associated brake disk, stop means associated with said brake pad independently of the fluid motor means for determining the at rest position of said brake pad, and automatic adjusting means associated with said stop means for adjusting the at rest position of said brake pad to compensate for wear, said automatic adjusting means being effective to adjust the position of said stop means upon movement of the brake pad greater than a predetermined amount when said brake pad is actuated by said fluid motor means, said automatic adjusting means including a male threaded member, a female threaded member engaged with said male threaded member, said members being movable relative to each other in an axial direction upon relative rotation thereof, one of said members being fixed axially relative to the brake pad, the other of said members being fixed axially relative to a brake support, and means for disengaging said members from each other for axial movement of the member axially fixed relative to the brake pad and for axial movement of the brake pad without relative rotation of the members upon actuation of the fluid motor means and if more than a predetermined degree of wear of the lining of the brake pad has taken place.